United States Patent
Mao et al.

(10) Patent No.: US 9,882,459 B2
(45) Date of Patent: Jan. 30, 2018

(54) VIBRATING MOTOR

(71) Applicants: Lubin Mao, Shenzhen (CN); Hongxing Wang, Shenzhen (CN); Fei Hou, Shenzhen (CN)

(72) Inventors: Lubin Mao, Shenzhen (CN); Hongxing Wang, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 211 days.

(21) Appl. No.: 15/069,072

(22) Filed: Mar. 14, 2016

(65) Prior Publication Data

US 2017/0033656 A1    Feb. 2, 2017

(30) Foreign Application Priority Data

Jul. 31, 2015 (CN) .......................... 2015 2 0570913

(51) Int. Cl.
*H02K 33/00* (2006.01)
*H02K 33/16* (2006.01)

(52) U.S. Cl.
CPC .................................. *H02K 33/16* (2013.01)

(58) Field of Classification Search
CPC ............................... H02K 33/00; H02K 33/18
USPC ................................................ 310/15, 25, 28
See application file for complete search history.

(56) References Cited

U.S. PATENT DOCUMENTS

2014/0125151 A1\* 5/2014 Furukawa ............. H02K 35/00
                                                                310/25
2015/0123498 A1\* 5/2015 Yang .................... H02K 33/16
                                                                310/25

\* cited by examiner

*Primary Examiner* — Thanh Lam
(74) *Attorney, Agent, or Firm* — Na Xu; IPro, PLLC

(57) ABSTRACT

A vibrating motor is provided in the present disclosure. The vibrating motor includes a shell providing a receiving cavity, a vibrating unit received in the receiving cavity, a pair of elastic members for elastically suspending two opposite ends of the vibrating unit to the shell, and a linking module. The linking module includes a pair of linking units rotably engaged with the two opposite ends of the vibrating unit respectively. Each of the linking units includes a linking rod and a guiding pin fixed to the shell. An end of the linking rod is engaged with the guiding pin, and the other end of the linking pod is engaged with a corresponding end of the vibrating unit.

17 Claims, 3 Drawing Sheets

VIBRATING MOTOR

FIELD OF THE DISCLOSURE

The present disclosure generally relates to vibrating motor technologies, and more particularly, to a vibrating motor for providing vibration feedback.

BACKGROUND

Portable consumer products, such as mobile phones, handheld game players, navigation devices and portable multi-media players, generally include vibrating motors for generating vibration feedback. For example, the vibrating motor may be used in a mobile phone for providing vibrating system feedback while receiving an incoming call, or used in a portable multi-media player for providing haptic feedback.

A typical vibrating motor includes a vibrating unit and a pair of elastic members suspending the vibrating unit. The elastic members perform an elastic deformation for providing an elastic driving force to drive the vibrating unit to vibrate along a vibration direction. However, the elastic members may deform in any direction, this may cause the vibrating unit to suffer shaking deviating from the vibration direction. Therefore, a vibration performance and a reliability of the vibrating motor is low.

Therefore, it is desired to provide a vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
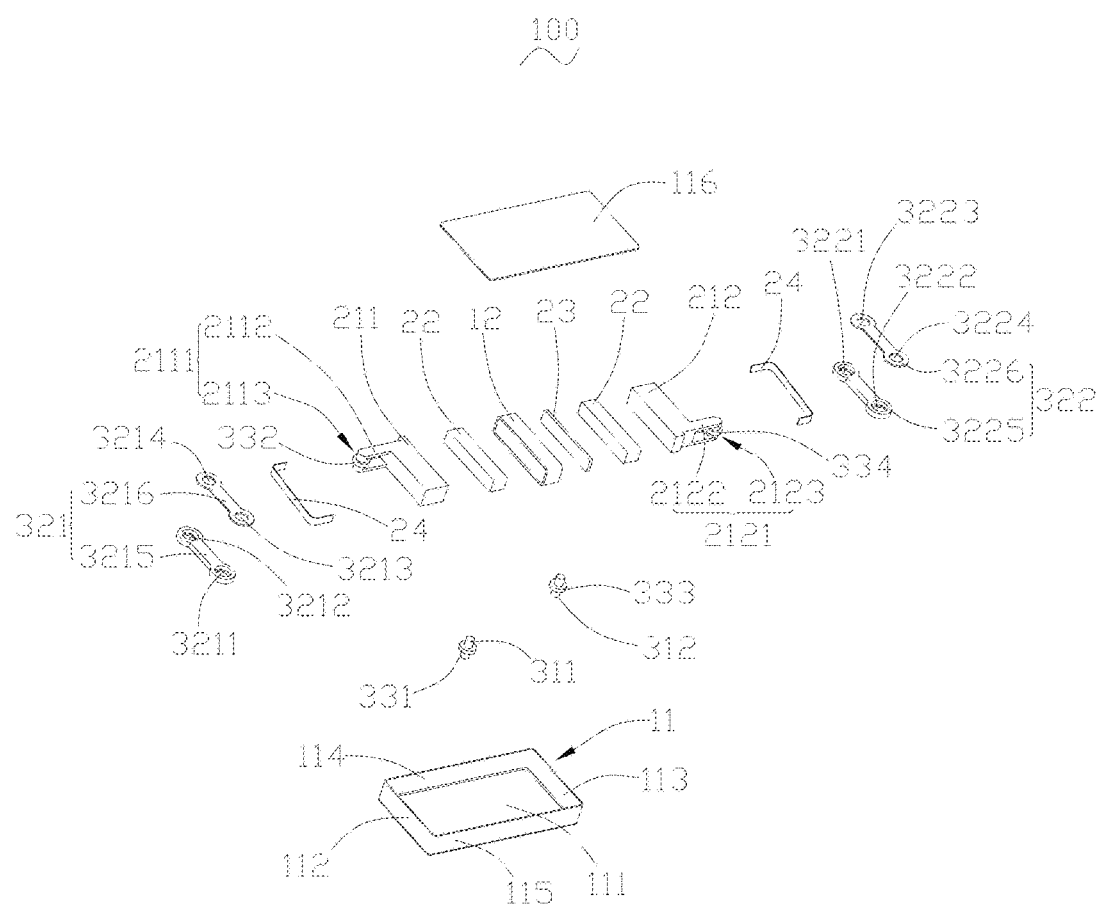
FIG. 1 is an exploded view of a vibrating motor according to an exemplary embodiment of the present disclosure.
Figure 2:
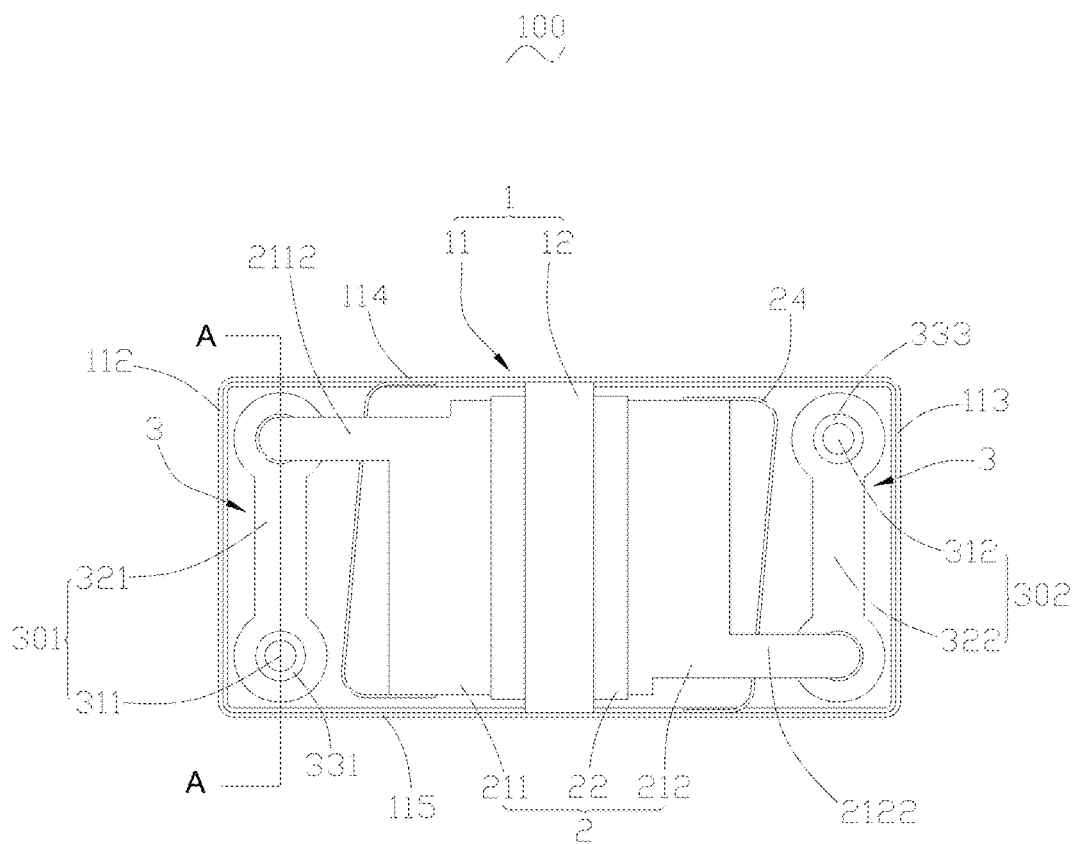
FIG. 2 is a partial, planar view of the vibrating motor in FIG. 1.
Figure 3:
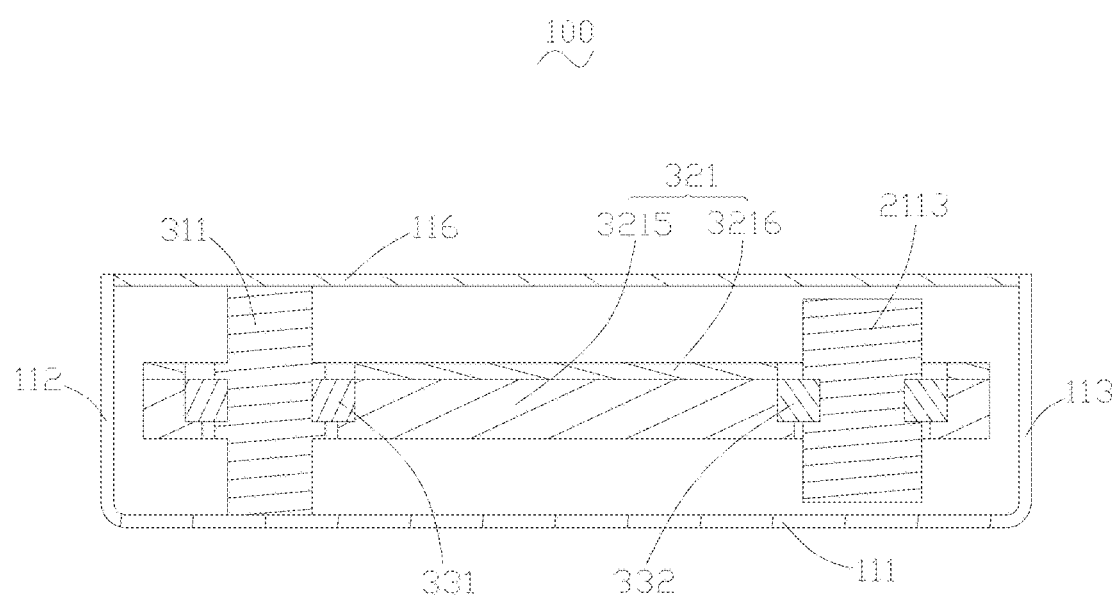
FIG. 3 is a cross-section view of the vibrating motor in FIG. 2, taken along line A-A.

Referring to FIGS. 1-3, a vibrating motor 100 according to an exemplary embodiment of the present disclosure is shown. The vibrating motor 100 includes a fixed unit 1, a vibrating unit 2, a linking module 3 and a pair of elastic members 24. The fixed unit 1 provides a receiving cavity for receiving the vibrating unit 2, the linking module 3 and the elastic members 24. The elastic members 24 are configured for elastically suspending two opposite ends of the vibrating unit 2 in a receiving cavity. The linking module 3 is rotably engaged with the two opposite ends of the vibrating unit 2 respectively.

The fixed unit 1 includes a shell 11 for providing the receiving cavity and a coil 12 received in the shell 11. The shell 11 includes a bottom plate 111, a first sidewall 114, a second sidewall 115, a third sidewall 113, a fourth sidewall 112 and a top plate 116. The first sidewall 114, the third sidewall 113, the second sidewall 115 and the fourth sidewall 112 extend perpendicularly from the bottom plate 111 and are connected end to end for forming a main housing. The top plate 116 covers the main housing to define the receiving cavity.

In the present embodiment, the bottom plate 111 may be a rectangular plate. The first sidewall 114 and the second sidewall 115 are parallel to each other and extend from two long edges of the bottom plate 111 respectively. The third sidewall 113 and the fourth sidewall 112 are parallel to each other and perpendicular to the first sidewall 114 and the second sidewall 115, and extend from two short edges of the bottom plate 111. The coil 12 has a ring-like structure, and is fixed to the bottom plate 111 of the shell 11.

The vibrating unit 2 includes a first mass member 211 and a second mass member 212 opposite to each other, a pair of magnets 22 and a yoke 23. The yoke 23 is arranged between the pair of magnets 22, and cooperates with the pair of magnets 22 to form a magnetic module. The magnetic module is located between the first mass member 211 and the second mass member 212. The pair of magnets 22 is respectively connected to the first mass member 211 and the second mass member 212. The magnetic module is at least partly surrounded by the coil 12; for example, in the present embodiment, the magnetic yoke 23 is entirely surrounded by the coil 12, and the pair of magnets 22 is partly surrounded by the coil 12.

The first mass member 211 includes a first main body and a first connection part 2111; the first connection part 2111 extends perpendicularly from an end of the first main body in a direction away from the magnetic module (i.e., towards the fourth sidewalls 112), and is adjacent to the first sidewall 114 of the shell 11. The first connection part 2111 includes a pair of first connecting arms 2112 parallel to the bottom plate 111, and a first connecting pillar 2113 connected between the pair of first connecting arms 2112 and perpendicular to the bottom plate 111. The first connecting pillar 2113 is apart from the first main body of the first mass member 211, such that a gap exists between the pair of first connecting arms 2112.

The second mass member 212 has a configuration similar to the first mass member 211. The second mass member 212 includes a second main body and a second connection part 2121; the second connection part 2121 extends perpendicularly from an end of the second main body in a direction away from the magnetic module, and is adjacent to the second sidewall 115 of the shell 11. Moreover, the second connection part 2121 includes a pair of second connecting arms 2122 parallel to the bottom plate 111, and a second connecting pillar 2123 connected between the pair of second connecting arms 2122 and perpendicular to the bottom plate 111. The second connecting pillar 2123 is apart from the second main body of the second mass member 212, such that a gap exists between the pair of second connecting arms 2122.

Furthermore, in the present embodiment, the second connection part 2121 of the second mass member 212 is diagonally arranged to the first connection part 2111 of the first mass member 211 in the vibrating unit 2, and accordingly, the first connecting pillar 2113 of the first connection part 2111 and the second connecting pillar 2123 of the second connection part 2121 are substantially symmetrical to each other about a central point of the vibrating unit 2.

In the present embodiment, the pair of elastic members 24 is connected to the first mass member 211 and the second mass member 212 respectively. For example, one of the elastic members 24 is elastically connected between an end of the first mass member 211 and the first sidewall 114 of the shell 11, and the other one of elastic members 24 is elastically connected between an end of the second mass member 212 and the second sidewall 115 of the shell 11. Each of the elastic members 24 may be a U-shaped elastic member having an elastic arm and two extending parts extending from two opposite ends of the elastic arm. The elastic arm passes through the corresponding gap between the first connecting arms 2111 of the first mass member 211 or the second connecting arms 2121 of the second mass member 212, and the two extending parts are respectively connected to a corresponding sidewall 114 or 115 of the shell 11 and a corresponding mass member 211 or 212.

The linking module 3 includes a first linking unit 301 and a second linking unit 302. The first linking unit 301 includes a first linking rod 321 and a first guiding pin 311. The first linking rod 321 includes a first rod body 3215 and a second rod body 3216; the second rod body 3216 covers and is attached onto the first rod body 3215. Moreover, the first rod body 3215 includes a first end having a first through hole 3211, and a second end opposite to the first end and having a second through hole 3212; in addition, two ends of the second rod body 3216, which correspond to the first end and the second end of the first rod body 3215, include a third through hole 3213 and a fourth through hole 3214 respectively. The third through hole 3213 and the fourth through hole 3214 are aligned with the first through hole 3211 and the second through hole 3212 respectively.

The first guiding pin 311 may be a rod pin fixed to the bottom plate 111 and is adjacent to a connecting joint between the second sidewall 115 and the fourth sidewall 112. The first end of the first rod body 3215 and the corresponding end of the second rod body 3216 may be rotably engaged with the first guiding pin 311; for example, the first guiding pin 311 may pass through the first through hole 3211 of the first rod body 3215 and the third through hole 3213 of the second rod body 3216. Moreover, the second end of the first rod body 3215 and the corresponding end of the second rod body 3216 is engaged with the first connecting pillar 2113 of the first mass member 211; for example, the first connecting pillar 2113 may pass through the second through hole 3212 of the first rod body 3215 and the fourth through hole 3214 of the second rod body 3216.

Furthermore, referring also to FIG. 3, in order to reduce a friction between the first linking rod 321 and the first guiding pin 311, a first bearing member 331 may be provided around the first guiding pin 311, and the first bearing member 331 may be received in the first through hole 3211 of the first rod body 3215; similarly, a second bearing member 332 may also be provided around the first connecting pillar 2113 and received in the second through hole 3212 of the first rod body 3215, so as to reduce a friction between the first linking rod 321 and the first connecting pillar 2113 of the first mass member 211.

The second linking unit 302 may have a configuration similar to that of the first link unit 301. Specifically, the second linking unit 302 includes a second linking rod 322 and a second guiding pin 312. The second linking rod 322 also includes a first rod body 3225 and a second rod body 3226; the second rod body 3226 covers and is attached onto the first rod body 3225. Moreover, the first rod body 3225 includes a first end having a first through hole 3221, and a second end opposite to the first end and having a second through hole 3222; in addition, two ends of the second rod body 3226, which correspond to the first end and the second end of the first rod body 3225, include a third through hole 3223 and a fourth through hole 3224 respectively. The third through hole 3223 and the fourth through hole 3224 are aligned with the first through hole 3221 and the second through hole 3222 respectively.

The second guiding pin 312 may also be a rod pin fixed to the bottom plate 111, and is adjacent to a connecting joint between the first sidewall 114 and the third sidewall 113. In other words, the second guiding pin 312 is diagonally arranged to the first guiding pin 311 in the shell 11, and thus is symmetrical to the first guiding pin 311 about the central point of the vibrating unit 2. As such, the first connecting pillar 2113, the second connecting pillar 2123, the first guiding pin 311 and the second guiding pin 312 are respectively located at four corners of a presumptive rectangular region defining a vibrating range of the vibrating unit 2.

The first end of the first rod body 3225 and the corresponding end of the second rod body 3226 may be rotably engaged with the second guiding pin 321; for example, the second guiding pin 312 may pass through the first through hole 3221 of the first rod body 3225 and the third through hole 3223 of the second rod body 3226. Moreover, the second end of the first rod body 3225 and the corresponding end of the second rod body 3226 is engaged with the second connecting pillar 2123 of the second mass member 212; for example, the second connecting pillar 2123 may pass through the second through hole 3222 of the first rod body 3225 and the fourth through hole 3224 of the second rod body 3226.

Furthermore, in order to reduce a friction between the second linking rod 322 and the second guiding pin 312, a third bearing member 333 may be provided around the second guiding pin 312 and received in the first through hole 3221 of the first rod body 3225; similarly, a fourth bearing member 334 may also be provided around the second connecting pillar 2123 and received in the second through hole 3222 of the first rod body 3225, so as to reduce a friction between the second linking rod 322 and the second connecting pillar 2123 of the second mass member 212.

In operation, the coil 12 provides a driving force to drive the vibrating unit 2 to vibrate, and the elastic members 24 may deform elastically and provide an elastic recovery force to the vibrating unit 2, so that the vibrating unit 2 is capable of performing vibration along a vibration direction parallel to the bottom plate 111, and during the vibration of the vibrating unit 2, the first linking rod 321 and the second linking rod 322 of the linking module 3 rotates in a vibrating plane of the vibrating unit 2. Due to the linking module 3, the vibrating unit 2 is restricted not to deviating from the vibrating plane. Therefore, the vibrating unit 2 is enabled to perform a linear vibration without suffering shaking or any other motion in other directions. As such, a vibration performance and a reliability of the vibrating motor 100 are both improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A vibrating motor, comprising:
   a shell providing a receiving cavity;
   a vibrating unit received in the receiving cavity;
   a pair of elastic members for elastically suspending the vibrating unit in the receiving cavity; and a linking module comprising a pair of linking units rotably engaged with two opposite ends of the vibrating unit respectively;

wherein each of the linking units comprises a linking rod and a guiding pin fixed to the shell; an end of the linking rod is engaged with the guiding pin, and the other end of the linking rod is engaged with a corresponding end of the vibrating unit.

2. The vibrating motor of claim 1, wherein the linking rod comprises a first rod body and a second rod body, the second rod body covers and is attached on the first rod body.

3. The vibrating motor of claim 2, wherein the first rod body comprises a first end with a first through hole, and a second end with a second through hole; the guiding pin passes through the first through hole of the first rod body, and the second through hole is engaged with a corresponding end of the vibrating unit.

4. The vibrating motor of claim 3, wherein each of the linking unit further comprises a first bearing unit surrounding the guiding pin and received in the first through hole.

5. The vibrating motor of claim 3, wherein the vibrating unit comprises a pair of mass members and a magnetic module arranged between the pair of mass members, each of the mass members includes a connection part extending from an end of the mass member and towards a corresponding one of the linking unit.

6. The vibrating motor of claim 5, wherein the connection part of the mass member comprises a pair of connecting arms parallel to each other, and a connecting pillar perpendicular to and connected between the connecting arms, the connecting pillar passes through the second through hole of the first rod body.

7. The vibrating motor of claim 6, wherein each of the linking units further comprises a second bearing member surrounding the connecting pillar and received in the second through hole.

8. The vibrating motor of claim 6, wherein the second rod body comprises a third through hole and a fourth through hole aligned with the first through hole and the second through hole of the first rod body respectively, the guiding pin and the connecting pillar also pass through the third through hole and the fourth through hole respectively.

9. The vibrating motor of claim 5, wherein the connection part of one of the mass members is diagonally arranged to the connection part of the other one of the mass members in the vibrating unit, and symmetrical to each other about a central point of the vibrating unit.

10. The vibrating motor of claim 6, wherein each of the elastic members is a U-shaped elastic member.

11. The vibrating motor of claim 10, wherein the elastic member comprises an elastic arm passing through a gap between the pair of the connecting arms of a corresponding mass member.

12. The vibrating motor of claim 11, wherein the elastic member further comprises two extending parts extending from two opposite ends of the elastic arm; the two extending parts are respectively connected to the shell and the corresponding mass member.

13. The vibrating motor of claim 5, wherein the magnetic module comprises a pair of magnets and a yoke arranged between the pair of magnets.

14. The vibrating motor of claim 1, wherein the shell comprises a main housing and a top plate covering the main housing for forming the receiving cavity, the main housing comprises a bottom plate opposite to the top plate, and the guiding pin is fixed to the bottom plate.

15. The vibrating motor of claim 13, wherein the guiding pin of one of the linking units is diagonally arranged to the guiding pin of the other one of the linking units in the main housing.

16. The vibrating motor of claim 13, further comprising a coil for driving the vibrating unit to vibrate, the coil is fixed to the bottom plate of the shell.

17. The vibrating motor of claim 13, wherein the linking module is configured for restricting the vibrating unit to vibrate in a vibrating plane parallel to the bottom plate.

* * * * *